United States Patent [19]

Ha et al.

[11] 3,811,091

[45] May 14, 1974

[54] ELECTRONIC TACHOMETER

[75] Inventors: In W. Ha, San Jose; James J. Touchton, Sunnyvale, both of Calif.

[73] Assignee: Itel Corporation, San Francisco, Calif.

[22] Filed: Aug. 24, 1972

[21] Appl. No.: 283,528

[52] U.S. Cl. .................. 328/1, 324/175, 328/127

[51] Int. Cl. .................. G08c 11/00

[58] Field of Search ............ 307/228, 311; 328/127, 328/1, 73, 75; 330/3, 24; 324/160, 165, 166, 173, 174, 175

[56] References Cited

UNITED STATES PATENTS

| | | | |
|---|---|---|---|
| 3,597,696 | 8/1971 | Rabindran | 330/3 |
| 3,590,277 | 6/1971 | South | 307/228 |
| 3,482,174 | 12/1969 | James | 330/3 |
| 3,631,262 | 12/1971 | Jarrett | 330/24 |
| 3,378,779 | 4/1968 | Priddy | 330/24 |
| 3,191,072 | 6/1965 | Magleby | 307/228 |
| 3,114,114 | 12/1963 | Atherton | 307/228 |
| 3,577,012 | 5/1971 | Dummermuth | 307/228 |
| 3,147,397 | 9/1964 | Michaelson | 307/228 |
| 3,541,320 | 11/1970 | Beall | 307/127 |
| 3,652,791 | 3/1972 | Shuey | 330/3 |

*Primary Examiner*—Rudolph V. Rolinec
*Assistant Examiner*—R. E. Hary
*Attorney, Agent, or Firm*—Moore, Zimmerman & Dubb

[57] ABSTRACT

This invention relates to a tachometer for detecting the velocity of movement of a moveable member by use of signals indicating passage of that member past predetermined points along the path of movement.

6 Claims, 4 Drawing Figures

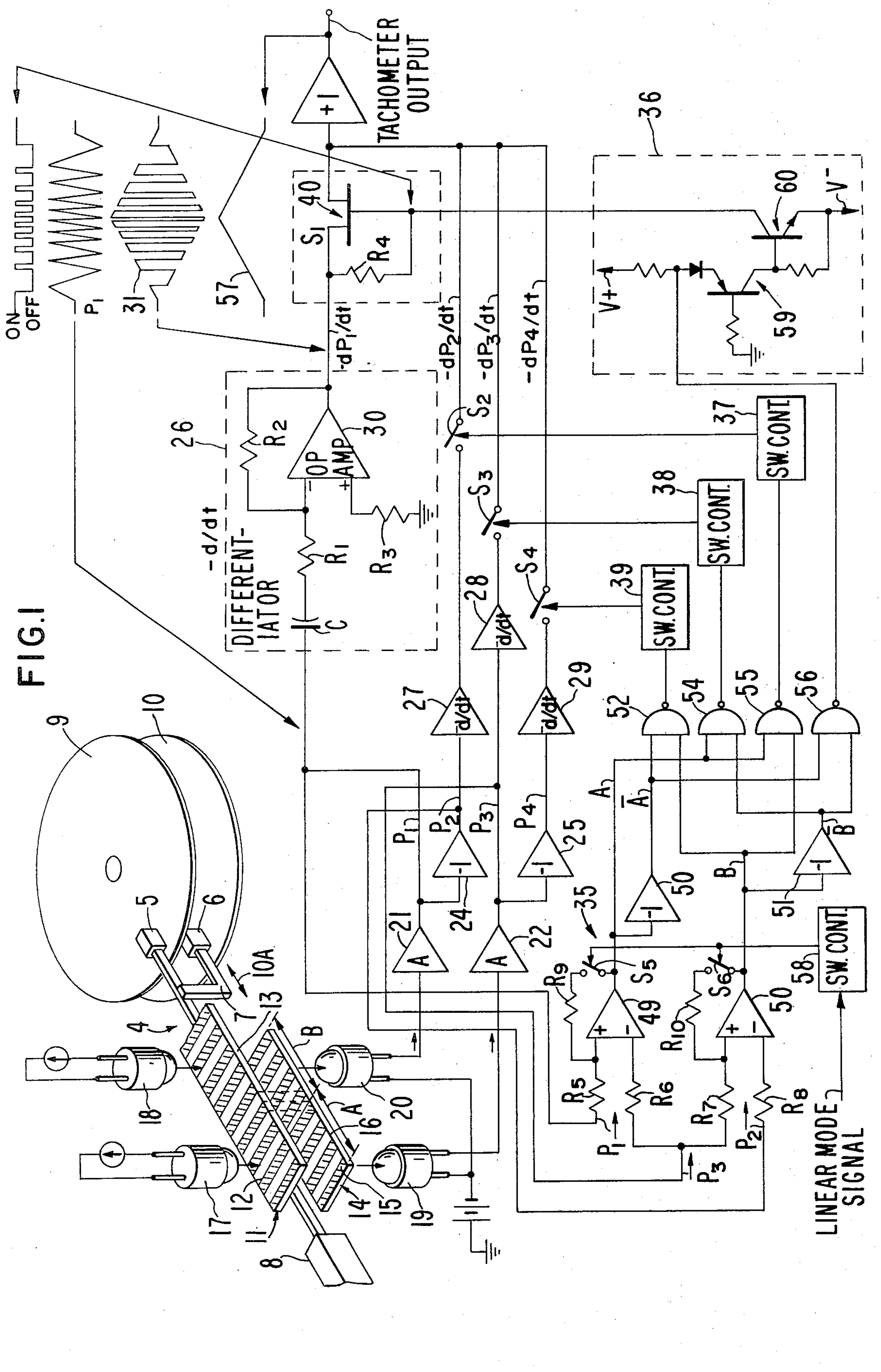
FIG. I

ELECTRONIC TACHOMETER

BACKGROUND OF THE INVENTION

1. Field of the Invention

This invention relates to the precise detection of the velocity of movement of moveable members, and is particularly adapted for use with such apparatus as recording heads which are translated across a rotating disc surface in a disc drive subsystem for reading and writing information to be used in an associated computer system.

2. Description of the Prior Art

The invention is particularly adapted to be used for the detection of the velocity of movement of a read/-write head across a recording disc surface such as that used in disc file subsystems in computer systems. While not limited to this use, the particular adaptation comes from the fact that in present technology systems, the most accurate measurement of head position comes from a detecting means indicating movement of the head past prerecorded tracks on the disc surface. Since the prerecorded tracks may not have been recorded previously by use of the particular disc drive apparatus, there is no exact means for obtaining a positive signal by detecting the head position relative to the disc drive itself as has been done in previous disc drive subsystems. Thus, it now has become necessary to assure that the velocity signal means generated by the head position sensing means on the disc drive is suitable for use with the new generation track servo controlled disc drives.

In previous disc file subsystems, there existed a correlation between position of the head as detected by the head position means associated with the head actuating means, and the tracks on the recording disc. This correlation occurred because the tracks were recorded as a result of a positioning of the heads as determined by the head positioning means associated with that particular or a similar disc drive. Thus it was not only possible but extremely efficient to use such devices as the signal generator for an electronic tachometer such as is disclosed in U.S. Pat. No. 3,568,059, Electronic Tachometer, issued on Mar. 2, 1971 to Frank J. Sordello and having Information Storage Systems, Inc., of Cupertino, California as the assignee. By use of such a tachometer it was possible to know the velocity of movement of the head at any precise position of the head relative to the disc surface.

In subsequent data file subsystems there exists one change in the basic operation which precludes a tachometer of the type disclosed in the previously identified patent from being totally effective in detecting the velocity of movement of the recording head relative to the disc surface. In such recent systems, the data track positions are determined by prerecorded tracks recorded on the disc surface, or at least one disc surface of an assembly of several discs known as a disc pack, prior to usage on the disc drive. There still exists in association with the head movement, a means to detect the general positioning of the head relative to the disc file, which means can be used to indicate head velocity. However, there can be a considerable tolerance between this position and velocity indicating means and the actual position of the head as determined by the prerecorded tracks on the disc surface. These differences are due primarily to the normal manufacturing tolerances existing between the mechanical interfaces of the disc pack and the disc drive. Thus, the prerecorded track positions on the disc pack are those used to determine where the recorded tracks will be located with usage of the disc pack and the velocity indicating means must be made to corrolate with that head positioning means. A further difficulty arises in utilizing passage of the head past predetermined track positions to generate a velocity signal since this method renders only an intermittent signal, and it has been found highly desirable to generate a constant signal indicating the velocity of movement of the head. It is the solving of these problems to which the subject invention is directed.

SUMMARY OF THE INVENTION

A velocity signal generating system for generating a signal responsive to the velocity of movement of a moveable member along a predetermined path comprising; means to generate a plurality of first piece wise linear or intermittent signals responsive to movement of the moveable member past predetermined positions spaced along the path, in combination with differentiator means for differentiating said first intermittent signals to achieve a plurality of velocity signals, and means to transmit said velocity signals to an output circuit of the system during alternate periods of time in response to the sensing of a predetermined condition of the velocity signals thereby to supply a substantially constant signal responsive to the velocity of the moveable member.

DESCRIPTION OF THE DRAWINGS

FIG. 1 is a circuit diagram with waveforms of a preferred embodiment of the invention;

DESCRIPTION OF A PREFERRED EMBODIMENT

Figures 2A, 2B, 2C:
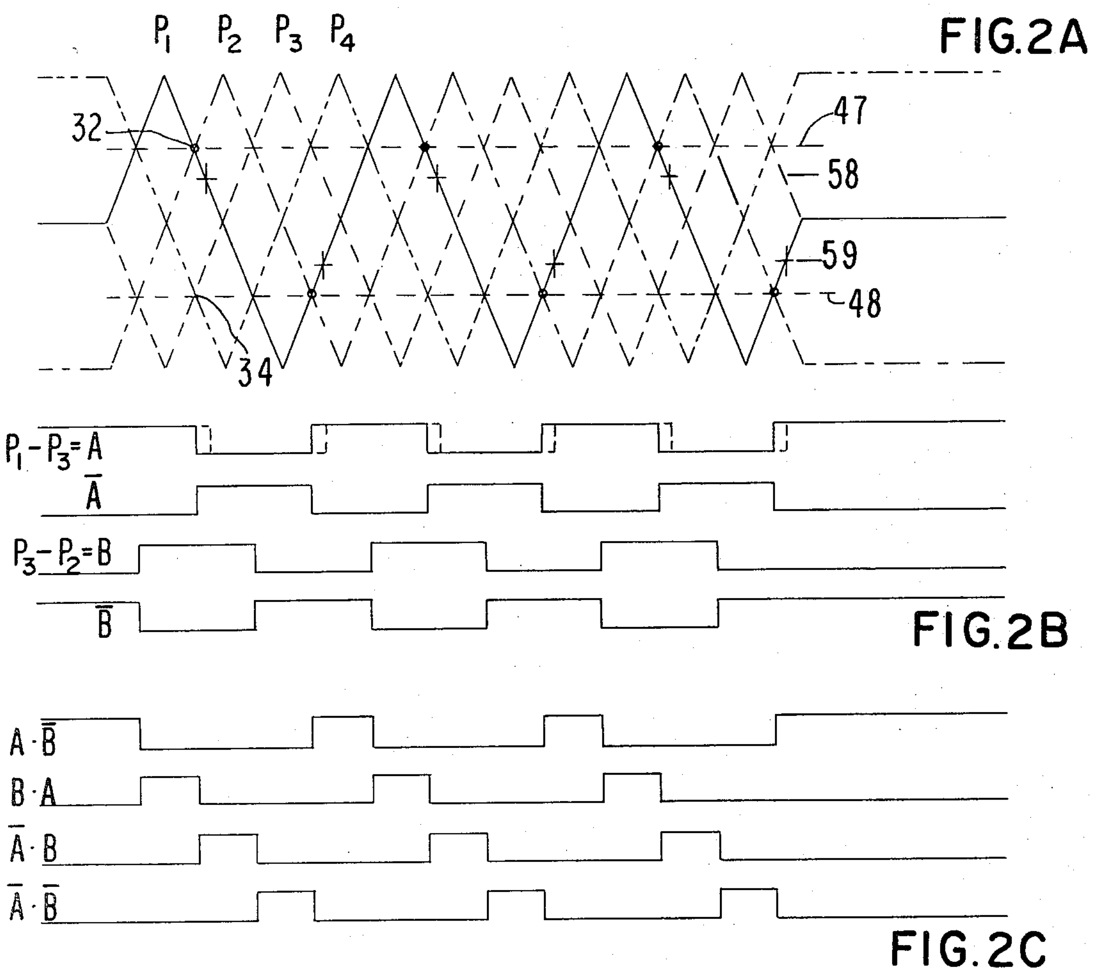
FIGS. 2A–2C are a combination of the signal wave forms and a timing diagram for the circuit of FIG. 1.

In FIG. 1 is shown one method of detecting movement of a moveable member 4 comprising a pair of recording heads 5 and 6 held by a support 7 for movement by an actuator 8 across the surfaces of the rotating discs 9 and 10, respectively. The track positions of the disc drive system shown are determined by prerecorded tracks (not shown) on the surface of the disc 10. To detect the position of the heads, a grid 11 comprising a transparent plate 13 having spaced opaque lines 12 thereon is fixed to the moveable member of the disc drive system shown. Fixed adjacent to the moveable grid 11 is a grid 14 fixed in position and comprising opaque lines 15 on a transparent plate 16.

Positioned to pass light through both grids 11 and 14, are a pair of light emitting diodes 17 and 18 with associated light sensitive light diodes 19 and 20. As the opaque lines of the fixed and moveable grids are positioned with the opaque lines aligned, no light is passed from one light emitting diode to the associated light sensitive diode followed by a time period when the transparent plate portions align to permit the detection of light by the light sensitive diode, thereby indicating a predetermined position spaced along the path of movement of the moveable member. With passage of light from the light emitting diode through the grids to the light sensitive diode, a signal is passed through one of the amplifiers 21 or 22, which signal is represented by the curves P1, P2, P3 and P (FIG. 2A) showing current flow as each position is passed. Naturally the frequency modulation of the signal is due to the change in velocity of the moveable member as it is accelerated and deaccelerated. Thus, the signal indicates that the moveable member has passed through a number of predetermined positions as movement is caused in the directions indicated by the arrows 10A. Each of the discrete positions indicated by the peaks of the curves P1, P2, P3 and P4 indicates the moveable member has passed a preselected point. While it is accepted practice to differentiate a signal indicative of the positioning of the moveable member and thereby obtain a velocity signal, such a velocity signal derived in this manner has certain deficiencies. One deficiency is that because the position signal is intermittent, the velocity signal will also be intermittent.

In accordance with one aspect of the invention, a pair of light sensitive diodes 19 and 20 are utilized which, in combination with a fixed grid having lines which are spatially 90° phase different, renders a pair of signals which are also 90° out-of-phase relative to each other. These signals in the form of currents generated by the light sensitive diodes are passed through the amplifiers 21 and 22 to obtain the signals P1 and P3 as shown in FIG. 2A of the drawings. These signals also are branched through inverters 24 and 25 to obtain the position signals P2 and P4 which are 180° out-of-phase with signals P1 and P3 respectively. Thereafter the signals P1, P2, P3 and P4 are differentiated to obtain intermittent velocity signals by passage through the differentiators 26, 27, 28 and 29 respectively. Such differentiators are commercially available and as shown in the schematic of differentiator 26, generally comprise an operating amplifier 30 having a differential input through resistors R1 and R3 with a resistor R2 connected in a feedback loop. Thus differentiation of position signal P1 renders an intermittent velocity signal as illustrated by the wave form 31 in FIG. 1. Similarly, differentiation of the other position signals renders intermittent velocity signals of similar form but with each being 90° out-of-phase with the adjacent signal. As pointed out heretofore, it is desirable to supply a continuous velocity signal for purposes of precise control of the moveable member.

To supply such a continuous velocity signal, it is necessary to select that differentiated position signal which at the time is present and existing most nearly in the linear state or condition. Thus, referring to FIG. 2A, it is desirable to select signal P1 between the points 32 and 35 because immediately thereafter the signal reverses upon passage of one of the preselected points by the moveable member. For this purpose, a switching means 35 is provided comprising a series of switches S1, S2, S3 and S4 in the output circuits of the differentiators with each switch being controlled by a switch control 36, 37, 38 and 39, respectively. As illustrated, each of the switch controls is similar to that denoted by the schematic of switch 36 and S1 and comprises a field effect transistor 40, the base voltage of which is controlled by the switch control 36.

The switch control 36 utilizes the simple fact that a field effect transistor exhibits very low resistive path between its drain and source when its gate is not reverse biased but exhibits very high impedance, practically open, when the gate is reverse biased. For instance when the signal from gate 56 is high, transistor 59 is turned on which turns transistor 60 on which reverse biases the gate of the field effect transistor 40 and turns switch S1 off. Thus, when the signal from gate 56 is low, the field effect transistor 40 is turned on.

For purposes of selecting that wave form in the linear state, the signal level detector circuit 35 is provided which serves as a switching means acting in response to the signal voltage. To detect the presence of each wave form, between the levels 47 and 48, there is provided the voltage level detector circuit comprising input lines supplying the signals P1, P2 and P3 to a pair of differential amplifiers 49 and 50. Thus, the output of amplifier 49 comprises P1 minus P3 indicated by the signal A in FIG. 2B. This signal, when passed through the invertor 50, becomes signal $\bar{A}$, while the output of amplifier 50 becomes signal B or P3 minus P2, and when passed through the invertor 51, becomes $\bar{B}$. When these signals are passed through the And gates 52, 54, 55 and 56, there is supplied a series of voltage or gating signals as shown in FIG. 2C of the drawings. These signals are derived by adding the signals shown in FIG. 2B, i.e., A, $\bar{A}$, B, $\bar{B}$, to render a timing chart indicating when each of the switches S1, S2, S3 and S4 are to be turned on for passage of that velocity signal supplied in the output of the associated differentiator to the output circuit of the tachometer. For instance, the gating signal $\bar{A}$, B is used to turn on switch S1 since that signal corresponds in voltage level change to the timing of position signal P1 between the points 32 and 34 in FIG. 2A. In this manner, that velocity signal is selected which is in the linear condition or range, i.e., between levels 47 and 48, and with the addition of all the signals, there is rendered a continuous velocity signal similar to that indicated by the curve 57 in FIG. 1.

The providing of a plurality of light emitting diodes as heretofore described still can present inherent difficulties since tolerances naturally exist in such a signal generating system as the light emitting diodes 19 and 20. In the past, an automatic gain control has been provided to assure that the signal output levels from each of the diodes was substantially equal. For instance, as shown in U.S. Pat. No. 3,597,750, Servo with AGC For Positioning a Magnetic Head, issued on Aug. 3, 1971 with Brunner et al as inventors, there is provided means to assure that the light outputs from the plurality of light emitting diodes of the position detector are substantially equal. Such is accomplished by interjecting into the system a mechanical "wiggle" or oscillation to permit balancing of the circuits. However, with the advent of more narrow tracks for recording purposes, it is found not feasible to intentionally induce such an oscillation into the system as such can cause the recording head to misalign with the data track sufficiently to cause errors in reading the data signal.

It has further been found however, that without such a gain control, the output signals P1, P2, P3 and P4 can vary in amplitude sufficiently that considerable noise will result in switching from one signal to the other because of the differences in amplitude of the signals. Thus, a further object of this invention is to limit any noise of other disturbance which might affect the disc drive operation without requiring an automatic gain control.

A further feature of this invention is to reduce any problems of varying signal strengths by the introduction of a hysteresis effect into the voltage level control 35. Such a hysteresis effect is added to the level detector to prevent violent switching between position signals with the attendant problems of noise as described heretofore. Hysteresis in the switching circuit is accomplished by the closing of switches S5 and S6 under control of the switch control 58 acting responsive to the linear mode or fine position signal of the position servo. Actually it should be understood that any of several signals in such a disc drive subsystem indicating the head is substantially positioned at the desired track position is suitable for switching the hysteresis circuit. The linear or fine mode signal is fully explained in U.S. Pat. No. 3,458,785, entitled Fine and Coarse Motor Positioning Control For A Magnetic Disc Memory, and issued on July 29, 1969. Thus, when the head position is very close to the actual position being sought, hysteresis is introduced into the switching circuit to prevent rapid switching in the voltage level detector circuit. Such rapid switching could occur in an instance in which the track position as indicated by the servo tracks on the disc 10 are offset sufficiently to correlate with a peak of one of the position signals P1 through P4. In such an instance, the switching circuit would switch rapidly between position signals as the position servo attempted to center onto a track position. By the introduction of the hysteresis into the switching circuit by providing a feedback loop through the resistors R9 and R10 of the amplifiers 49 and 50 respectively, the signal level switching points of the switching circuit are reduced to levels 58 and 59 of FIG. 2A. Thus the possibility that tolerances between the servo track and position sensing will cause rapid switching, is reduced or eliminated.

We claim:

1. A velocity signal generating system for generating a signal responsive to the velocity of movement of a moveable member along a predetermined path, said system comprising;

means to generate a plurality of intermittent position signals responsive to movement of the member past predetermined positions spaced along the path;

means to differentiate said intermittent position signals to generate a plurality of intermittent velocity signals, and means to transmit said velocity signals to an output circuit during alternate time periods thereby to supply a substantially constant velocity signal to the output signal.

2. A velocity signal generating system as defined in claim 1 wherein said position signal generating means are spaced in a manner to generate a plurality of position signals which are phase different relative to each other.

3. A velocity signal generating system as defined in claim 2 including means to invert selected ones of the position signals to generate a greater number of phase different position signals.

4. A velocity signal generating system as defined in claim 1 wherein said means to transmit said velocity signals to the output circuit includes means to detect and transmit each velocity signal during the time period a predetermined condition exists.

5. A velocity signal generating system as defined in claim 4 wherein said means to detect is a signal level detector for detecting and transmitting each velocity signal as it occurs between predetermined signal levels.

6. A velocity signal generating system as defined in claim 5 including means to change the predetermined signal levels in response to a predetermined condition of the moveable member.

* * * * *